United States Patent [19]

Lanter et al.

[11] Patent Number: 5,120,565

[45] Date of Patent: Jun. 9, 1992

[54] EXTRUDED, HIGH-FAT ANIMAL FEED NUGGET

[75] Inventors: Kent J. Lanter, Millstadt, Ill.; David C. Weakley, Eureka, Mo.

[73] Assignee: Purina Mills, Inc., St. Louis, Mo.

[21] Appl. No.: 593,831

[22] Filed: Oct. 5, 1990

[51] Int. Cl.$^5$ ............................................. A23K 1/00
[52] U.S. Cl. ................................. 426/623; 426/448; 426/523; 426/630; 426/601; 426/656; 426/807
[58] Field of Search ............... 426/623, 630, 636, 807, 426/601, 656, 634, 448, 523

[56] References Cited

U.S. PATENT DOCUMENTS

| | | | |
|---|---|---|---|
| 3,908,025 | 9/1975 | Miller et al. | 426/623 |
| 4,143,169 | 3/1979 | Skoch et al. | 426/623 |
| 4,225,630 | 9/1980 | Pitchon | 426/623 |
| 4,418,086 | 11/1983 | Marino et al. | 426/623 |

OTHER PUBLICATIONS

Appendix F, pp. 528-529, 1976 AFMA Book, "Feed Manufacturing Technology".

*Primary Examiner*—R. B. Penland

[57] ABSTRACT

Hard, stable, farinaceous extruded animal feed nuggets comprising at least about 20 wt % starch, at least about 15 wt % of an added fat and less than about 15 wt % water are prepared by a method comprising the steps of:

A. plasticizing a blend of starch, water and added fat in an extruder,

B. extruding the plasticized blend to form an animal feed nugget, and

C. drying the nugget to a water content of less than about 15 wt %.

These energy dense nuggets are a useful feed supplement to the diets of a wide variety of animals, particularly dairy cows.

13 Claims, No Drawings

EXTRUDED, HIGH-FAT ANIMAL FEED NUGGET

BACKGROUND OF THE INVENTION

1. Field of the Invention

This invention relates to animal feed supplements. In one aspect, the invention relates to extruded, high-fat animal feed nuggets suitable for consumption by ruminants and other animals raised for commercial purposes. In another aspect, the invention relates to a method of making an extruded, high-fat animal feed nugget using conventional extrusion equipment. In yet another aspect, the invention relates to finished feed products of which the extruded, high-fat animal feed nugget is a components.

2. Description of the Prior Art

Fat is a desirable component of most animal diets, and the art is replete with methods of introducing it into the diets of various livestock. In addition to serving as an energy source, fat can have an impact on the quality and quantity of milk production in dairy animals and meat production of animals raised for slaughter, e.g. various ruminants, pigs, poultry and fish.

Many methods are known for introducing fat into an animal diet, and for packaging it into a convenient and useful form for handling, storage and eventual consumption. For example, Scott and Hills teach in U.S. Pat. No. 3,925,560 a method for improving the utilization of lipid materials by ruminants comprising feeding the ruminants an emulsion or emulsion product comprising homogeneous lipid bodies dispersed within an edible medium. The feed supplement can be in the form of a finely divided particulate solid, e.g. diameters of 0.01 to 5 millimeters, or may be prepared and administered as a liquid emulsion.

Sawhill teaches in U.S. Pat. No. 4,804,546 a stable, thixotropic suspension of fat in an aqueous liquid gel of a feed solution. The gel is prepared by forming a solution of sugar, protein or a mixture of both, and then incorporating ammonium phosphate into the solution followed by the addition of water, and then fat.

McAski teaches in U.S. Pat. No. 4,826,694 a feed stuff for ruminants comprising an edible, water-insoluble salt of an edible fatty acid, free fat, an excess of the salt-forming metal, and other nutritional material, such as proteinaceous meal (e.g. soybean). The feed stuff is produced as a friable product.

While the above described methods are effective for introducing fat into an animal diet, usually the most desirable method is to introduce the fat (or at least a major portion of the fat) as a component of a pellet which itself is a component of a finished feed product. However, incorporating more than four or five weight percent (wt %) of fat into the body of the pellet (or an extruded particle) is difficult and has led to the development of a specialized body of art. For example, U.S. Pat. No. 2,945,764 by Lanz and U.S. Pat. No. 3,014,800 by Guidarelli teach methods for producing dry, hard feed pellets containing fat. In both instances, relatively low amounts of fat are incorporated into the body of the pellet and the remaining fat, up to an additional 15 wt %, is applied as a coating to the pellet.

Handy in U.S. Pat. No. 3,623,885 and Skoch and Sewell in U.S. Pat. No. 4,143,169 teach a related technique for the incorporation of fat into a hard, dry animal food produced as an extruded nugget. However as reported in these teachings, incorporating more fat within the pellet or nugget results in undesirable crumbling and excessive fines, while similar amounts applied onto the surface of the pellet or nugget produces a product that is soft, friable, and has a greasy texture.

SUMMARY OF THE INVENTION

According to this invention, a hard, farinaceous, extruded animal feed nugget comprising at least about 20 wt % starch, at least 15 wt % added fat and less than about 15 wt % water, is prepared by a method comprising the steps of:

A. plasticizing a blend of a starch source, water and added fat at an elevated temperature and pressure, and B. forming an animal feed nugget by extruding the plasticized blend of (A) above through a restricted orifice into an environment of lower temperature and pressure than that used to plasticize the blend in (A) above, and C. drying the extruded nugget to a water content of less than about 15 wt %, based on the total weight of the nugget.

Animal feed nuggets prepared by this method contain within the nugget body, as opposed to just on its surface, relatively high amounts of added fat, typically in excess of 20%, and are an excellent energy source that can be incorporated into a variety of finished feed products. Ruminants can consume these nuggets without adversely influencing their ability to digest dietary fiber or other nutrient components, and these nuggets improve the palatability of various finished feed products. Moreover when fed to dairy cows, the energy dense nuggets can actually increase both milk and milk fat production, and help to maintain or increase the body condition of the animal.

DETAILED DESCRIPTION OF THE INVENTION

The animal feed nugget of this invention is a food supplement comprising a relatively homogeneous blend of starch and an added fat. At least about 20 wt %, preferably at least about 30 wt %, of the nugget is starch. Any starch source can be used but corn and wheat are the preferred sources, particularly corn and wheat flour. Barley, oats, sorghum, tapioca, their milled components and combinations of any two or more of these (including corn and wheat) are examples of other starch sources.

Particle size is an important physical characteristic of the starch sources used to prepare the nuggets of this invention. Typically, at least about 50%, preferably at least about 75% and more preferably at least about 90%, can pass through a Tyler No. 50 mesh screen; at least about 37%, preferably at least about 56%, and more preferably at least about 67%, can pass through a Tyler No. 100 mesh screen; and at least about 25%, preferably at least about 37%, and more preferably at least about 45%, can pass through a Tyler No. 200 mesh screen. The remainder of the starch source can be of a much larger particle size although typically the remainder does not have a Modulus of Fineness (as defined by the American Society of Agricultural Engineers Recommendation R246.1) in excess of 3.0, preferably not in excess of about 2.0. Generally the more starch present in the animal feed nugget, the more starch of a larger particle size can be used and conversely, the less starch present in the animal feed nugget, the less starch of a larger particle size starch can be used. For example, if the animal feed nugget is to contain less than 50 wt starch, then a starch flour, such as corn or wheat flour, is the starch source of preference. One hundred percent of most, if not all, starch flour will pass through a Tyler No. 100 mesh screen. If the animal feed nugget is to contain more than 50 wt % starch, then half or more of the starch source can consist of larger particles, such as commercially ground wheat or corn. Starch particles that can pass through a Tyler No. 50 mesh screen have a Modulus of Fineness of less than about 0.5, and starch particles that can pass through a Tyler No. 100 mesh screen have a Modulus of Fineness of zero.

As here used, "added fat" includes liquid and soluble materials comprising edible mono-, di- and triglycerides of fatty acids and free fatty acids which are not inherently present in the starch source (or any other nonfat sources that may be present, e.g. the indigenous fat present in meat meal, fish meal, oleaginous seed, etc.). Added fat includes both animal fat, e.g. bleachable fancy tallow, choice white grease, yellow grease, etc.; vegetable oil, e.g. soybean oil, palm oil, cottonseed oil, sunflower oil, etc.; and combinations of any of these. The amount of added fat in the nugget is typically at least about 15 wt %, preferably at least about 20 wt %. The maximum amount of added fat in the nugget is typically not greater than about 35 wt % although more may be present depending upon the other ingredients and the conditions under which the nugget is formed.

In addition to the starch and fat components, the animal feed nugget can contain significant amounts of other nutritional values as well. These values, if present, are present for nutritional considerations and are not essential to producing a hard, stable, high-fat nugget (although they may facilitate such production). One such value is protein which can be selected from a wide assortment of sources, with soybean, cottonseed and corn gluten meal as preferred sources. Other proteinaceous sources include other oil seed meals such as palm oil; animal by-product meals such as meat meal, poultry meal, blood meal, feather meal and fish meal; plant by-product meals such as wheat middlings, soybean hulls and corn by-products; and microbial protein such as torula yeast and brewer's yeast. Here too, the meal is of a relatively fine particle size, preferably having a Modulus of Fineness of less than about 3.0, and preferably of less than about 2.0.

If a protein source is included in the nugget, its amount can vary widely relative to the other nugget components. Typically, the ratio of protein to starch sources in the final nugget is between about 3:1 to about 1:3, preferably between about 2:1 to about 1:2. A ratio of about 1:1 is typical. The protein and starch ingredients together typically comprise between about 80 and about 60%, preferably between about 75 and about 65 wt %, of the total composition of the nugget on a dry weight basis.

A hallmark of the animal feed nuggets of this invention is that the added fat is within or an integral part of the nugget, as opposed to a coating upon the nugget. The added fat is admixed with the starch and optional nonstarch ingredients, if any, prior to or within the extruder to form a relatively homogeneous blend, subjected to extruder cooking conditions (plasticized), and then extruded and cut into nuggets. Some fat will form part of the nugget surface but only in the same context that the starch and nonstarch ingredients, if any, will form part of the nugget surface, i.e. as a component of a relatively homogeneous mass. While more fat can be added to the nugget in the form of a coating subsequent to the formation of the nugget, this is not required for the practice of this invention.

Ingredients other than starch, protein, added fat and water may be present in the animal feed nugget. These include flavorings such as molasses, coloring and dye ingredients, vitamins and minerals, and various processing aids, such as glycerol monostearate. These other ingredients are present, if present at all, in minor amounts relative to the combined amount of starch and added fat. They are used in known ways for conventional purposes.

The nuggets are formed through the use of conventional extrusion devices, such as that disclosed in U.S. Pat. No. 3,496,858. Typically, the starch and other dry, nonfat ingredients, if any, such as protein and glycerol monostearate, are first blended in a dry mixer to form a relatively homogeneous mixture, and this mixture is then fed to the extruder, typically through the conditioner. The extruder usually operates at a temperature of at least about 100° C., and this temperature in combination with the pressure caused by the action of the rotating screw on the mixture and the friction between the flowing mixture and the component parts of the extruder result in a pressure within the extruder typically in excess of 20 psig, preferably in excess of 30 psig. The mixture is mechanically worked by the rotating screw until it eventually flows in a generally fluid manner.

Fat is added to the extruder, typically at the conditioner, and once the mixture of fat and nonfat ingredients is a relatively homogeneous, free-flowing mass, it is fed into the extruder barrel where it can be admixed with additional fat. The action of the rotating screw and extruder conditions (e.g. temperature and pressure) maintain the mass in a homogeneous, free-flowing state.

Steam is also added to the extruder (at both the conditioner and barrel) to increase the temperature of the material, typically to or in excess of about 100° C. and/or to raise the moisture content of the mixture. The amount of heat and steam applied to the mixture is controlled by known valving techniques in a manner to obtain temperatures which are sufficiently high to cause the desired chemical and physical reactions ("cooking" or gelatinizing the starch) within the mixture. The amount of heat and steam actually added to a given mixture of added fat and nonfat ingredients will vary with the nature and ratio of components and the other operating parameters of the extruder, e.g. pressure, residence time of the mixture, etc.

Certain extruder designs are preferred to other designs with respect to their ability to work and eventually extrude a starch-based mixture containing at least 20 wt % fat. Twin screw extruders and single screw extruders with an interrupted flight design with barrel projections meshing with the spaces of the interrupted flight, such as that of an Anderson extruder, are preferred over single screw, continuous flight extruders. The high fat mixtures in the latter tend to exhibit more slippage than in the former, and thus the ultimate extrusion of the mixture is less efficient.

After the mixture, including the added fat and any optional ingredients, have been sufficiently blended and cooked, they are forced from the extruder by the rotating screw or screws through a restricted orifice. Since the mixture emerges from an environment of high temperature and pressure into an environment of lower temperature and pressure (typically ambient or room temperature and pressure), and the mixture expands upon leaving the extruder. This results in a cooling of the mixture and a partial loss of its water content (in the form of steam). The mixture leaves the extruder in an extended ribbon which is cut into nuggets by any conventional cutting means, typically as it leaves the extruder. A typical extruded product as it leaves the extruder has a bulk density between about 35 and about 50 lbs per bushel.

The high fat extrudate is very sticky and can be difficult to dry. Since it is important to reduce the moisture content of the extrudate to less than about 15 wt %, preferably less than about 10 wt %, to obtain a stable, hard-finished product, a fluidized bed dryer, such as a Jetzone ® Fluidized Belt Dryer, is the drying means of preference. The impinging air separates the particles as well as efficiently drys them to an acceptable water content. Other dryer designs, such as perforated bed dryers and tray dryers, can be used but tend to be less efficient.

The production of hard, stable, high-fat extruded animal feed nuggets is dependent not only upon the ingredients and parameters described above, but also upon the manner in which these ingredients and parameters are employed with respect to one another. For example, to obtain a hard, stable extruded nugget containing 30 or more percent added fat, preferably a small percentage (e.g. about 0.25 wt %) of glycerol monostearate is admixed with the starch source. Similarly, the ingredient recipe may vary with the design of the extruder and its operating conditions. The water content of both the finished nugget and the homogeneous blend in the extruder before, during and subsequent to its cooking can also vary. As here used, "hard" means that the nuggets have a durability rating of about 70% or better as measured by the K-State Pellet Quality Test (as described in Appendix F at pp 528-9 of the 1976 AFMA book entitled *Feed Manufacturing Technology*).

The finished nugget is used as a food supplement, typically as a component of a finished feed product designed for a particular species of animal. For example, when used as a feed supplement for dairy cattle, the nugget will typically be blended with a pre-mixed ration that itself is in a nugget or pellet form and consists of such ingredients as starch, plant and animal protein sources, vitamin and mineral additives, nitrogen sources, and the like. This ration is fed to the dairy cattle along with fibrous foodstuffs, such as alfalfa and corn silage, and of course, water. In such a diet, the fat present in the extruded animal feed nugget is the principal source of fat in the animal's diet. The overall mix of ingredients in the animal's diet are selected to maximize the desired health and milk production of the animal.

The following examples are illustrative of certain specific embodiments of this invention. Unless indicated to the contrary, all parts and percentages are by weight.

SPECIFIC EMBODIMENTS

Example 1

About 10 tons of hard, stable animal feed nuggets were prepared from the following recipe:

| Corn Flour | 37.5% |
|---|---|
| Soybean Meal (SBM) | 37.5% |
| Glycerol Monostearate (GMS) | 0.25% |
| Bleachable Fancy Tallow (BFT) | 24.75% |

The purchased corn flour, SBM (ground through a No. 4 Hammermill screen) and GMS were placed in the above proportions in a dry mixer and blended until a homogeneous mixture was obtained. The Modulus of Fineness was about 0.3 for the corn flour and about 2.3 for the SBM. The mixture was then fed to a 125 horsepower, 8" Anderson cooking extruder equipped with a 0.234 inch die (48 holes). The extruder was run at the following conditions:

| Feeder (RPM) | 8.0 |
|---|---|
| Dry Feed Rate (lbs/min) | 50 |
| Fat Rate (lbs/min) | 16.4 |
| Extruder (amps) | 55 |
| Blades | 4 |
| Water Conditioner (gal/min) | 3.4 |
| Conditioned Meal Temp. (°C.) | 104 |

The fat was fed into the conditioner at a temperature of about 42° C., and the resulting mixture was mechanically worked within the extruder at a temperature in excess of 100° C. with the pressures varying slightly but generally above 20 psig. The homogeneous starch/protein/added fat mixture was continuously passed through the extruder and finally through the extruder die. The mixture was ejected from the die in a continuous stream and was a coherent structure which expanded with passage through the die to form a dense, amphorous structure. The product was sliced into nuggets as it exited the die, and it had a bulk density of 43 lbs/bu. The nuggets were then transferred by conveyor belt to a type SB Jetzone ® Fluidized Belt Dryer and subjected to the following processing conditions:

| Vibrations/min | 225 |
|---|---|
| Temperature zone 1 | 243-254° C. |
| Temperature zone 2 | 232-246° C. |

The nuggets entered the dryer with a water content of about 27 wt % and after 5.5 minutes in the dryer at the above-stated conditions, left the dryer with a water content of about 8%. The finished nuggets exhibited a hard surface with good particle integrity (more than 90% were held on a Tyler No. 6 mesh screen after being subjected to the K-State Pellet Quality Test).

Example 2

Twenty-four mid-lactation cows were group-housed and group-fed forge as a mixture of corn silage (50%) and alfalfa hay (50%) on a dry matter basis offered at a minimum of 55% of their dry matter intake. For a three week period, all cows were fed a non-fat control (A) milking ration in a stanchion feeding area twice daily. At the end of this period, first calf and older cows were ranked separately according to percent milk fat and randomly allocated to treatments for another four week period. Milking rations were fed twice daily with treatments being A (non-fat control, 100% pellets) and B (30% nugget, 70% pellet). The nuggets were those prepared in Example 1 above. The pellets were a non-added fat, feed supplement containing starch, protein, nitrogen and various vitamin and mineral sources. Weeks two and three of the preliminary period were used as covariance, and weeks three and four of the treatment period were used to test treatment effects.

The results of this test are reported below:

| Test Measurement | Control A | Extruded Nugget Containing Treatment (B) |
|---|---|---|
| Milk Rationing Intake (lb/h/d)* | 25.6 | 26.5 |
| Dry Matter Intake (lb/h/d)* | 50.7 | 52.0 |
| Milk (lb/h/d)* | 54.2 | 64.8 |
| 4% Fat-Corrected Milk (lb/h/d)* | 50.3 | 58.3 |
| Fat, % | 3.49 | 3.35 |
| (lb/h/d)* | 1.89 | 2.17 |
| Protein, % | 3.49 | 3.25 |
| (lb/h/d)* | 1.89 | 2.11 |

*(pounds/head/day)

As the above data demonstrate, the overall result from feeding cows a daily ration including an energy-dense nugget was a major increase in milk as a consequence of higher nutrient content while increasing milk fat and milk protein production.

Example 3

The procedure of Example 1 was repeated except the recipe consisted of 25 wt % bleachable fancy tallow, 74.75 wt % corn flour and 0.25 wt % glycerol monostearate. The corn flour had a Modulus of Fineness of about 0.3. The extruder was run at the following conditions:

| Dry Feed Rate (lbs/min) | 75 |
|---|---|
| Fat Rate (lbs/min) | 25 |
| Extruder (amps) | 92 |
| Knife Blades | 4 |
| Water Conditioner (lbs/min) | 21 |
| Conditioned Meal Temp. (°C.) | 99 |

The BFT was fed into the extruder (WENGER X-200) at a temperature of about 43° C., and the resulting mixture was mechanically worked within the extruder at a temperature in excess of 100° C. with the pressures varying slightly but generally above 20 psig. The homogeneous starch/BFT mixture was ejected through the die in a continuous stream and produced a dense, amorphous structure. The product was sliced into nuggets upon its exit from the die and had a bulk density of about 40 lbs per bushel. A sample of approximately ten pounds was then transferred to a Proctor Schwartz Perforated Bed Dryer and subjected to the following conditions:

| Retention Time (min) | 20 |
|---|---|
| Temperature zone 1 | 120° C. |
| Temperature zone 2 | 120° C. |

The nuggets entered the dryer with a water content of about 28 wt % and after 20 minutes in the dryer at the above-stated conditions, left the dryer with a water content of about 9%. The finished nuggets had a hard surface and good particle integrity.

Example 4

The procedure of Example 1 was repeated to prepare a formulation of a supplemental feed nugget suitable for consumption by salmon. The formulation is detailed below:

| Fish Meal (%) | 49.78 |
|---|---|
| Corn Flour (%) | 23.21 |
| Dicalcium Phosphate (%) | 4.46 |
| Glycerol Monostearate (%) | 0.22 |
| Fish Oil (%) | 22.32 |

The Modulus of Fineness of the fish meal was about 1.5 and of about 0.3 for the corn flour. The extruder was a Wenger Model X 20 Extruder equipped with a 30 hp motor variable speed drive and a one hole 3/16 inch die. The batch size was about 300 lbs and the fish oil (added fat) was added at the conditioner. The extruder was run at the following conditions:

| Conditioned Meal Temp. (°C.) | 96 |
|---|---|
| Water Conditioner (lbs/min) | .27 |
| Water Barrel (lbs/min) | 1.24 |
| Extruder (RFM) | 423 |
| Extruder (amps) | 16 |
| Feeder (RPM) | 16.5 |
| Feeder Rate (dry)(lbs/min) | 4.3 |
| Fish Oil (lbs/min) | 1.41 |
| Density Wet (lb/bu) | 46 |
| Density Dry (lb/bu) | 37.5 |

The fish oil was fed into the extruder at a temperature of about 26° C., and the resulting mixture was mechanically worked within the extruder at a temperature in excess of about 100° C. with the pressures varying slightly but generally above 20 psig. The homogeneous added fat/nonfat ingredient mixture was continuously passed through the extruder and finally through the extruder die. The mixture was ejected from the die in a continuous stream and was a coherent structure which expanded with passage through the die to form a dense, amorphous structure. The product was sliced upon ejection from the die into nuggets, transferred to a tray-type dryer, and dryed at 105° C. for about 30 minutes. The nuggets entered the dryer with a water content of about 28 wt % and after 30 minutes in the dryer at the above-stated conditions, left the dryer with a water content of about 9%. The finished nuggets had a hard surface and good particle integrity.

Example 5

The procedure of Example 1 was repeated to prepare animal feed nuggets of the following formulations:

| BFT, % | 25 | 25 | 25 |
|---|---|---|---|
| Corn flour, % | 37.375 | 37.5 | 37.375 |
| Soy flour (49), % | 37.375 | 37.5 | — |
| Cottonseed meal (fine), % | — | — | 37.375 |
| GMS, % | .25 | 0 | .25 |

The Modulus of Fineness of the corn flour was about 0.3, of the soy flour less than about 0.5, and of the cottonseed meal of about 1.5. The Wenger extruder described in Example 4 above was employed except that the die hole was 0.234 inches in diameter. The extruder was run at the following conditions:

| Conditioned Meal Temp. °C. | 105 | 97 | 96 |
|---|---|---|---|
| Water Conditioner (lbs/min) | .35 | .33 | .33 |
| Water Barrel (lbs/min) | 1.29 | 1.27 | 1.25 |
| Extruder (RPM) | 420 | 420 | 420 |
| Extruder (amps) | 16 | 15 | 14 |
| Feeder Dry (RPM) | 15.4 | 15.4 | 15.8 |
| Production Rated Wet (lbs/h) | 432 | — | 432 |

| | | | | |
|---|---|---|---|---|
| -continued | | | | |
| Density Wet (lbs/bu) | | 49 | 48 | 47 |
| Oil (lbs/min) | | .73 | .76 | .75 |

Sixty percent of the total BFT added to the formulation was added at the dry mixer while the remaining 40% was introduced into the blend at the extruder conditioner. The extruded nuggets were dryed in a tray-type dryer at 105° C. for about 50 minutes.

The nuggets entered the dryer with a water content of about 27 wt %, and left the dryer with a water content of about 10%. The finished nuggets had a hard surface and good particle integrity.

Example 6

Two groups (in two periods) of 12 lactating Holstein cows were divided into five groups and assigned to five diets to equalize dry matter (DM) intake and body weight among the five groups and to insure that a minimum of 4 animals per treatment of satisfactory intake completed the study.

The five diets differed by level (0, 3% or 6% of dietary DM) and type (bleachable fancy tallow (BFT) or soy oil) of fat to determine the influence of a saturated fat vs. an unsaturated fat on the digestibility of diet nutrient components when fed with diets containing 14.5% crude fiber contributed from forages. The fat was added to the diet via an extruded particle containing 80% corn flour and 20% fat prepared in a manner similar to that described in Examples 1 and 3. The extruded particles and associated premix pellets were mixed just prior to feeding. The diets were fed as total mixed rations (TMR) containing 51.4% of DM as milking ration and 48.6% of DM as forage (a mixture of 32.8% corn silage and 67.2% alfalfa hay DM).

After a minimum of two weeks on full feed intake, total collections of milk, urine and feces were made (for 5 days) for calculation of nutrient balances and digestibility (in each period).

The results of this test are reported below:

| Test Measurement | Control No Fat | 3% BFT | 6% BFT | 3% Soy Oil | 6% Soy Oil |
|---|---|---|---|---|---|
| Dry Matter Intake, (kg/h/d) | 19.9b | 18.1ab | 17.1ab | 18.4ab | 16.9a |
| Organic Matter Digested (%) | 64.3a | 68.9b | 71.1b | 69.0b | 71.0b |
| Total Digested Nutrients (TDN) (%) | 62.7a | 70.1b | 75.3c | 70.2b | 74.7c |
| Acid Detergent Fiber (ADF) Dig.(%) | 20.9 | 27.4 | 30.7 | 25.4 | 28.3 | abc = Means in a row not sharing a common letter are different (P < .08)

As the above data demonstrate, incorporating either BFT or soy oil in the energy dense nugget resulted in greater dietary TDN density and organic matter digestion, while having no adverse influence on dietary fiber digestibility.

Although the invention has been described in considerable detail through the preceding specific embodiments, this detail is for purposes of illustration. Many variations and modifications can be made by one skilled in the art without departing from the spirit and scope of the invention.

What is claimed is:

1. A process for preparing a hard, farinaceous, extruded animal feed nugget comprising at least about 20 wt % starch, at least about 15 wt % added fat and less than about 15 wt % water, a process comprising the steps of:
   A. Preparing a blend comprising at least about 20 wt % starch, water, and at least about 15 wt % of an added fat at an elevated temperature and pressure, the starch being in particle form with at least about 50% of the particles small enough to pass through a Tyler No. 50 mesh screen,
   B. Subjecting the bland of (A) to sufficient heat and pressure to gelatinize the starch,
   C. Forming an animal feed nugget by extruding the blend of (B) through a restricted orifice into an environment of lower temperature and pressure than that used to gelatinize the starch in the blend of (B), and
   D. Drying the extruded nugget to a water content of less than about 15 wt %.

2. The process of claim 1 in which protein is included in the blend of (A).

3. The process of claim 2 in which the ratio of protein to starch is between about 3:1 to 1:3.

4. The process of claim 3 in which the starch is obtained from at least one source selected from the group consisting of corn, wheat, barley, oats, sorghum and tapioca.

5. The process of claim 4 in which the protein is obtained from at least one source selected from the group consisting of soybean meal, cottonseed meal, corn gluten meal, palm oil mean, an animal by-product meal, a plant by-product meal, and a microbrial protein meal.

6. The process of claim 5 in which the added fat is at least one fat selected from the group consisting of bleachable fancy tallow, choice white grease, yellow grease, soybean oil, palm oil, cottonseed oil and sunflower oil.

7. The process of claim 6 in which the bland of (A) contains glycerol monostearate.

8. The process of claim 7 in which the environment of elevated temperature and pressure in step (C) is at a temperature of at least about 100° C. and a pressure of at least about 20 psig.

9. The process of claim 8 in which step (C) is conducted in an extruder equipped with an interrupted-flight, single screw.

10. The process as in one of the claims 1-9 in which at least about 67% of the starch particles are small enough to pass through a Tyler No. 100 mesh screen.

11. The process of claim 10 in which the starch source comprises at least about 50 wt % of the animal feed nugget.

12. The process of claim 10 in which the starch comprises at least about 30 wt % of the animal feed nugget.

13. The process of claim 12 in which the added fat comprises at least about 20 wt % of the animal feed nugget.

* * * * *